United States Patent
Pfohl

(10) Patent No.: US 8,944,122 B2
(45) Date of Patent: Feb. 3, 2015

(54) FILLER NECK WITH BLOCKER DEVICE FOR DIESEL FUEL TANK

(71) Applicant: Hans-Jürgen Pfohl, Grevenbroich (DE)

(72) Inventor: Hans-Jürgen Pfohl, Grevenbroich (DE)

(73) Assignee: MAGNA STEYR Fuel Systems GesmbH, Grevenbroich (DE)

( * ) Notice: Subject to any disclaimer, the term of this patent is extended or adjusted under 35 U.S.C. 154(b) by 145 days.

(21) Appl. No.: 13/790,162

(22) Filed: Mar. 8, 2013

(65) Prior Publication Data

US 2013/0233445 A1 Sep. 12, 2013

(30) Foreign Application Priority Data

Mar. 8, 2012 (DE) .......................... 20 2012 100 83
Mar. 8, 2012 (EP) ..................................... 12158613

(51) Int. Cl.
*B60K 15/05* (2006.01)
*B60K 15/04* (2006.01)

(52) U.S. Cl.
CPC ................. *B60K 15/05* (2013.01); *B60K 15/04* (2013.01); *B60K 2015/0483* (2013.01)
USPC .......................................... 141/350; 141/349

(58) Field of Classification Search
CPC ..................................................... B60K 15/05
USPC ......... 141/348, 349, 350, 356, 367, 369, 381; 220/86.2
See application file for complete search history.

(56) References Cited

U.S. PATENT DOCUMENTS

| | | | | |
|---|---|---|---|---|
| 2,737,401 A * | 3/1956 | Lindsay | ........................ | 137/553 |
| 6,968,874 B1 * | 11/2005 | Gabbey et al. | ................ | 141/349 |
| 7,293,586 B2 * | 11/2007 | Groom et al. | ................. | 141/350 |
| 7,665,493 B2 * | 2/2010 | Groom et al. | ................. | 141/350 |
| 7,721,775 B2 * | 5/2010 | Pozgainer | ..................... | 141/350 |
| 7,950,425 B2 * | 5/2011 | Och | .............................. | 141/367 |
| 7,967,042 B2 * | 6/2011 | Groom et al. | ................. | 141/367 |
| 8,191,588 B2 * | 6/2012 | Hagano | ......................... | 141/350 |
| 8,776,845 B2 * | 7/2014 | Hagano | ......................... | 141/350 |
| 2006/0032552 A1 * | 2/2006 | Hedevang | ..................... | 141/367 |
| 2007/0169845 A1 * | 7/2007 | Benjey et al. | ................. | 141/350 |
| 2008/0041492 A1 * | 2/2008 | Gabbey et al. | ................ | 141/350 |
| 2008/0178962 A1 * | 7/2008 | Baudoux et al. | .............. | 141/350 |
| 2008/0237231 A1 * | 10/2008 | Feichtinger | ................... | 220/86.2 |
| 2009/0020182 A1 * | 1/2009 | Groom et al. | ................. | 141/349 |
| 2010/0006178 A1 * | 1/2010 | Muth et al. | .................... | 141/350 |
| 2010/0132838 A1 * | 6/2010 | Cisternino et al. | ............ | 141/349 |
| 2010/0218849 A1 * | 9/2010 | Hagano | ......................... | 141/350 |
| 2011/0214783 A1 * | 9/2011 | Ichimaru et al. | .............. | 141/381 |
| 2012/0279612 A1 * | 11/2012 | Washio et al. | ................ | 141/350 |
| 2012/0312420 A1 * | 12/2012 | Kataoka et al. | ............... | 141/350 |
| 2013/0233445 A1 * | 9/2013 | Pfohl | ............................ | 141/350 |

FOREIGN PATENT DOCUMENTS

| | | | |
|---|---|---|---|
| DE | 10157090 C1 | 4/2002 | |
| DE | 202004013627 U1 | 1/2006 | |
| DE | 202005014387 U1 | 1/2007 | |
| EP | 1 284 212 A1 | 2/2003 | |
| EP | 1736351 A2 * | 12/2006 | ............ B60K 15/04 |
| EP | 1974976 A1 | 10/2008 | |

* cited by examiner

*Primary Examiner* — Timothy L Maust
*Assistant Examiner* — Andrew Schmid
(74) *Attorney, Agent, or Firm* — Jordan IP Law, LLC; Todd A. Vaughn

(57) ABSTRACT

A filler neck for a diesel fuel tank with a blocker device for preventing misfuelling with a nozzle of smaller diameter than the minimum diesel nozzle diameter, and includes control levers, a control spring, a blocker lever, a blocker latch and a blocker latch spring.

17 Claims, 13 Drawing Sheets

FILLER NECK WITH BLOCKER DEVICE FOR DIESEL FUEL TANK

CROSS-REFERENCE TO RELATED APPLICATIONS

The present application claims priority under 35 U.S.C. §119 to European Application No. EP 12158613.5 (filed on Mar. 8, 2012) and German Application No. DE 20 2012 100 830.0 (filed on Mar. 8, 2012), which are each hereby incorporated by reference in their respective entireties.

TECHNICAL FIELD

Embodiments relate to a filler neck for a diesel fuel tank with a blocker device configured to prevent mis-fuelling with a nozzle having a diameter which is less than the minimum diesel nozzle diameter.

BACKGROUND

Such devices are used to prevent fuelling of a diesel-powered motor vehicle with a petrol nozzle or at least to make it more difficult. In this respect use is made of the fact that diesel nozzles are known to have a larger diameter than petrol nozzles. Proper insertion of a nozzle of smaller diameter than the minimum diesel nozzle diameter into the filler neck of a diesel fuel tank is, therefore, prevented by a device of the stated type, so as to avoid mis-fuelling. Such devices are known from DE 20 2004 013 627 U1 or DE 20 2005 014 387 U1, for example.

In addition, DE 101 57 090 C1 discloses an arrangement for preventing fuelling of a diesel vehicle with unleaded petrol, with a blocker lever which can be moved to and fro and which is provided at its end remote from the filler opening with a blocker lug, which in the idle position projects into the cross-section of the filler neck and prevents insertion of a petrol pipe of smaller diameter into the tank and which in the fuelling position opens up the filler neck for insertion of a diesel pipe of larger diameter.

An inhibitor device for a filler nozzle is known from EP 1 736 351 A2. This device comprises a first and a second trap for a small filler nozzle, said traps each comprising a blocker unit, which is pivotable about a pivot axis and has a blocker arm, and each comprising an actuating arm, which is connected with a joint rod, which extends along the pivot axis of the blocker unit.

SUMMARY

Embodiments are related to a filler neck for a diesel fuel tank with a blocker device configured to prevent mis-fuelling, and has a nozzle with a diameter which is less than the minimum diesel nozzle diameter, which blocker device functions reliably and at the same time is inexpensive to produce.

In accordance with embodiments, a filler neck is provided for a diesel fuel tank with a blocker device configured to for prevent mis-fuelling, and has a nozzle with a diameter less than the minimum diesel nozzle diameter, the filler neck including: two control levers, which are mounted pivotably on control lever pivots in the filler neck housing, the control levers being constructed such that, on insertion of a nozzle of larger diameter than the minimum diesel nozzle diameter into the filler neck, the control levers perform a defined greater pivoting-out movement, which does not occur on insertion of a nozzle of smaller diameter than the minimum diesel nozzle diameter; a control spring, which is attached to the two control levers and is configured such that the defined greater pivoting-out movement of the control levers leads to a defined greater change in position for at least one control portion of the control spring; a blocker lever mounted on a blocker lever pivot in the filler neck housing, which lever is pivotable between a blocking position, in which insertion of a nozzle beyond the blocker lever is prevented and an open position, in which insertion of a nozzle beyond the blocker lever is allowed; a blocker latch, which may be moved between an immobilizing position and a non-immobilizing position, and which interacts with the blocker lever such that in its immobilizing position the blocker latch immobilizes the blocker lever in its blocking position and in its non-immobilizing position does not immobilize the blocker lever in its blocking position, whereby the blocker lever may be pivoted into its open position; a blocker latch spring, which loads the blocker latch towards its immobilizing position, the control spring interacting with the blocker latch in such a way that the blocker latch may be moved out of its immobilizing position into its non-immobilizing position by the defined greater change in position of at least the control portion of the control spring, and the blocker lever, if not immobilized in its blocking position, pivoting into its open position through insertion of a nozzle.

In accordance with embodiments, operational interaction of the control lever with the control spring, the blocker latch, the blocker lever and the blocker latch spring advantageously and reliably ensures that a larger diameter nozzle, i.e., a diesel nozzle, may be inserted into a filler neck, whereas a smaller diameter nozzle, i.e., a petrol nozzle, cannot be inserted into a filler neck.

In accordance with embodiments, in an idle position or on insertion of a small diameter nozzle, the two control levers are not pivoted sufficiently far out of their idle position, such that the control spring does not undergo any significant change in position either and thus remains in a position in which the control spring does not release the blocker latch from its immobilizing position, in which the blocker lever is immobilized in a blocking position by the blocker latch, such that insertion of a small diameter nozzle is prevented. By loading the blocker latch towards the immobilizing position, the blocker latch spring ensures that the blocker lever is immobilized in its blocking position in the absence of significant action of the control spring on the blocker latch.

On the other hand, on insertion of a nozzle of larger diameter than the minimum diesel nozzle diameter the two control levers are pivoted out sufficiently for the control spring to undergo a sufficient change in position to move the blocker latch into its non-immobilizing position, such that the blocker lever pivots into its open position through insertion of the larger diameter nozzle, so enabling further insertion of the nozzle.

In accordance with embodiments, a filler neck for a diesel fuel tank includes control levers mounted pivotably for movement between a first position on insertion of a nozzle of a diameter less than the minimum diesel nozzle diameter, to a second position upon insertion of a nozzle of a diameter greater than the minimum diesel nozzle diameter into the filler neck; a blocker lever mounted pivotably between a blocking position which prevents insertion of a nozzle beyond the blocking lever and an unblocking position in which insertion of a nozzle beyond the blocker lever is allowed; a blocker latch mounted for movement between an immobilizing position which immobilizes the blocker lever in its blocking position, and a non-immobilizing position which permits the blocker lever to move to the unblocking position; wherein the blocker lever, if not immobilized in the blocking position, is configured to pivot into the unblocking position through the insertion of a nozzle.

The change in position of at least the control portion of the control spring here proceeds with a force which is greater than the loading of the blocker latch towards the immobilizing position by the blocker latch spring, such that the defined greater pivoting-out movement of the control levers enables pivoting of the blocker lever into the open position thereof.

In accordance with embodiments, it goes without saying that in the filler neck it is also possible to use more than the stated number of components in each case, i.e., more than two control levers and more than one control spring, one blocker lever, one blocker latch and one blocker latch spring.

For a filler neck in accordance with embodiments, the inner sides, facing radially towards the inside of the filler neck, of the two control levers are preferably curved inwards. The inner sides of the control levers, thus, bulge outwards, such that the bulges of the control levers extend towards a nozzle which may have been inserted. In this way, the curved regions of the control levers are pushed outwards on insertion of a nozzle of sufficiently large diameter, the control levers thereby being pivoted outwards in their entirety. Suitable curvature of the inner sides of the control levers may also ensure that a nozzle inserted at an angle brings about a similar pivoting-out of the control levers as is brought about by the same nozzle when it is inserted straight into the filler neck.

In accordance with embodiments, the control lever pivots about which the control levers may be pivoted are located at the end of the filler neck facing the filler opening. In this way, the ends of the control levers remote from the filler opening are pushed outwards on insertion of nozzle of sufficient size.

For a filler neck in accordance with embodiments, the two control levers are offset relative to one another by 180 degrees around the filler neck, i.e., are opposite one another. This ensures that the two pivot levers rest well against a nozzle which has been inserted and the control levers are pivoted out to a sufficient degree even if a nozzle is not inserted centrally, so as to allow further insertion of the nozzle.

Advantageously, the minimum spacing of the inner sides of the two control levers facing radially towards the inside of the filler neck corresponds to the diameter of a petrol nozzle if no nozzle has been inserted into the filler neck. In this way, on insertion of a petrol nozzle the control levers are barely deflected or not at all, whereas on insertion of a diesel nozzle they are deflected to a significant degree.

In accordance with embodiments, the control spring is attached at both ends to the two control levers.

In accordance with embodiments, the control spring is attached to the control levers in each case at that end of the control levers which faces away from the filler opening. This control lever end facing away from the filler opening preferably performs the greatest pivoting out of the control lever, whereby this mode of attachment may bring about the greatest change in position of the control spring.

In accordance with embodiments, the control portion of the control spring is formed by a central, straight part of the control spring. While the control spring is preferably deflected at its ends by the control levers, the central part of the control spring is thus used to move the blocker latch. This central part of the control spring is particularly easy to guide when it extends straight.

In accordance with embodiments, the control portion of the control spring is preferably guided in a slot in the filler neck housing. In this way, movement of the control spring may be readily controlled.

In accordance with embodiments, the slot in the housing preferably extends radially from the outside inwards, i.e., at a variable distance with regard to the filler neck axis. Particularly preferably, the slot extends at a predetermined height, i.e., at a predetermined distance from the filler opening. The control portion of the control spring is thus guided radially inwards or outwards in the housing slot when changing position. Preferably, the control portion of the control spring is guided radially inwards by the defined pivoting-out movement of the control levers. The blocker latch may thereby substantially also be driven radially inwards by the control spring.

In accordance with embodiments, the defined greater change in position of at least the control portion of the control spring is achieved in that the ends of the control spring are pushed outwards by the control levers, and the control portion of the control spring is pushed inwards.

In accordance with embodiments, the blocker lever, in its blocking position, prevents insertion of a nozzle beyond the blocker lever by occupying a sufficient part of the filler neck diameter and in its open position allows insertion of a nozzle beyond the blocker lever by opening up a sufficient part of the filler neck diameter. The function of blocking or opening the filler neck for further insertion of a nozzle is thus achieved in that the blocker lever either occupies the diameter of the filler neck to such an extent that a nozzle can no longer pass through it, or does not occupy it to such an extent.

In accordance with embodiments, the blocker lever comprises a contour with a notch, wherein the blocker latch is located in its non-immobilizing position if a movable end of the blocker latch lies in the notch. Outside the notch the contour of the blocker latch forms a surface, for example a ramp, along which the blocker latch may be moved as far as the notch. If the blocker latch is resting on the surface outside the notch, the blocker latch prevents pivoting of the blocker lever towards the blocker latch. If the blocker latch enters the notch or at least arrives at the edge of the notch, a pivoting movement towards the blocker latch becomes possible.

In accordance with embodiments, the control portion of the control spring is pushed inwards on the defined greater change in position at least of the control portion of the control spring, and the mobile end of the blocker latch is thereby pushed into the notch in the blocker lever.

DRAWINGS

An explanation of embodiments is given below with reference to the drawings.

DESCRIPTION

Figure 1:
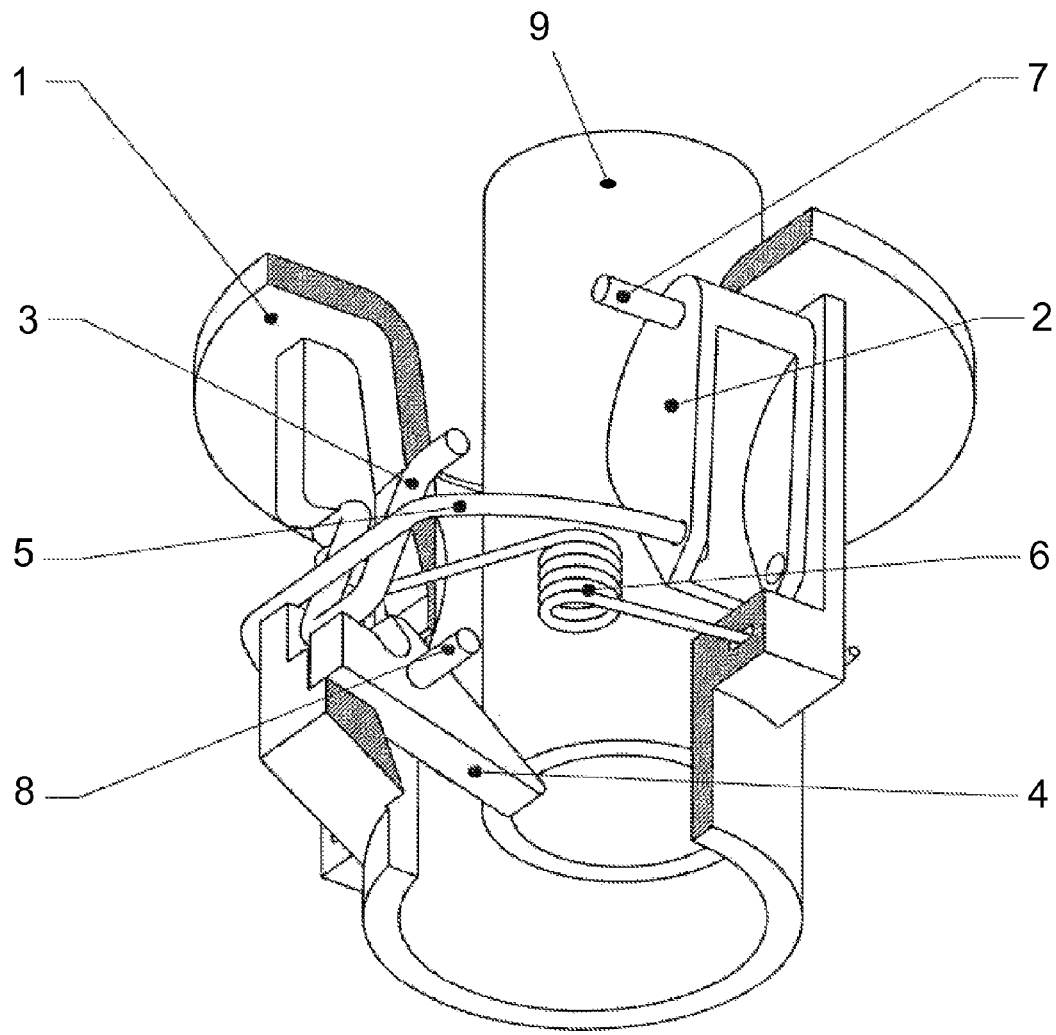
FIG. 1 illustrates a filler neck with a blocker device in accordance with embodiments.

FIG. 1 illustrates a three-dimensional sectional representation of a filler neck in accordance with embodiments for a diesel fuel tank with a blocker device which prevents mis-fuelling. In the filler neck housing 1, two control levers 2 are mounted pivotably about their control lever pivots 7, just one control lever 2 and its control lever pivot 7 being visible in FIG. 1. The control lever pivots 7 are located at the end of the filler neck facing the filler opening, i.e., at the top in the installation direction, such that the lower ends of the control levers 2 pivot outwardly about the control lever pivots 7. A bias mechanism such as a control spring 5 is attached at respective ends thereof in articulated manner to the control lever 2.

Centrally, the control spring 5 comprises a straight region, which rests radially to the outside against a blocker latch 3. On the opposite side, i.e., radially to the inside, the blocker latch 3 is loaded outwardly, i.e., against the control spring 5, by a blocker latch spring 6. The blocker latch 3 is mounted rotatably at its upper end facing the filler opening, and rests in turn with its mobile lower end against a blocker lever 4. The blocker lever 4 is mounted rotatably on a blocker lever pivot 8 in the filler neck housing. In a region adjacent to the bearing surface of the blocker latch 3, the blocker lever 4 comprises a notch, which is sufficiently large in size to be able to receive the movable end of the blocker latch 3. As a result of the blocker latch 3 resting on the flat surface of the blocker lever 4 outside the notch therein, the blocker lever 4 is immobilized, such that the blocker lever 4 cannot pivot downwardly about the blocker lever pivot 8. A nozzle 9 inserted into the filler neck is hindered by the immobilized blocker lever 4 from being inserted further into the filler neck beyond the blocker lever 4.

Figure 2:
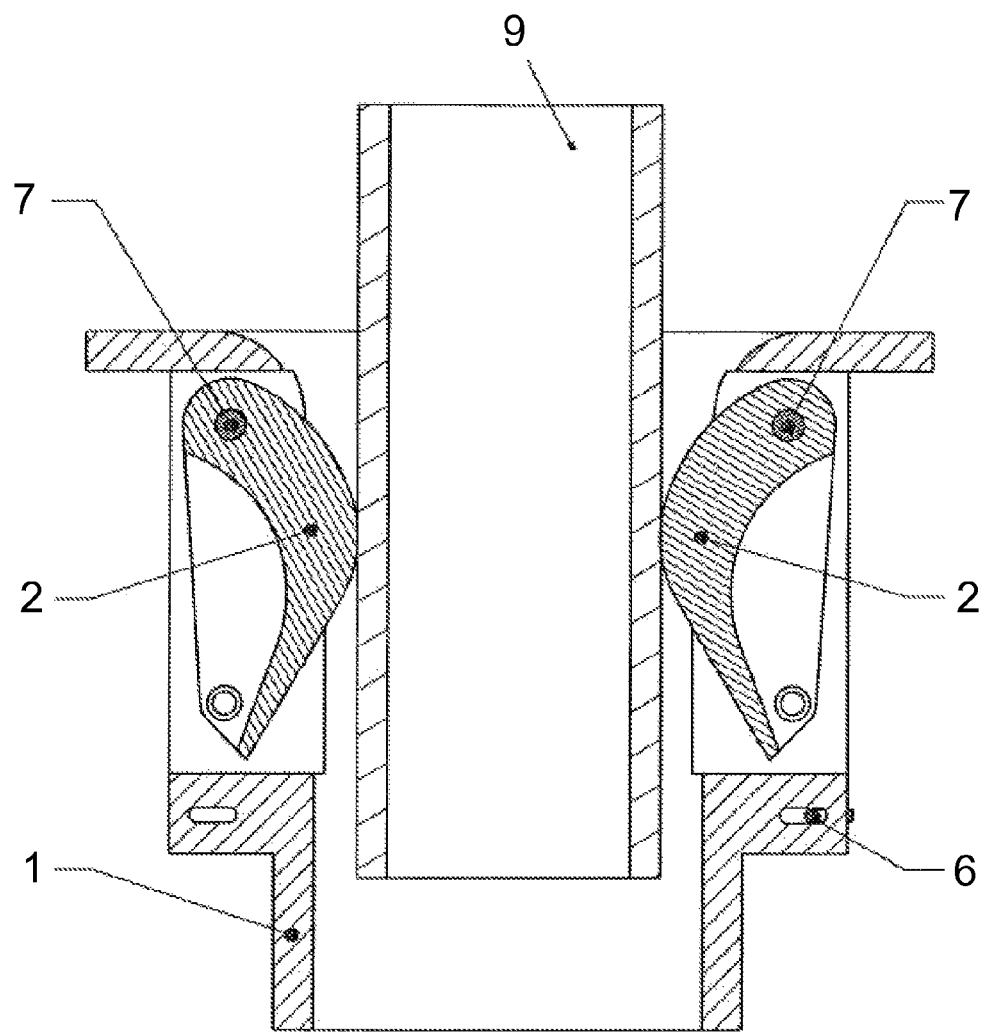
FIG. 2 illustrates a front view of a filler neck with a petrol nozzle of minimum diameter in accordance with embodiments.
Figure 3:
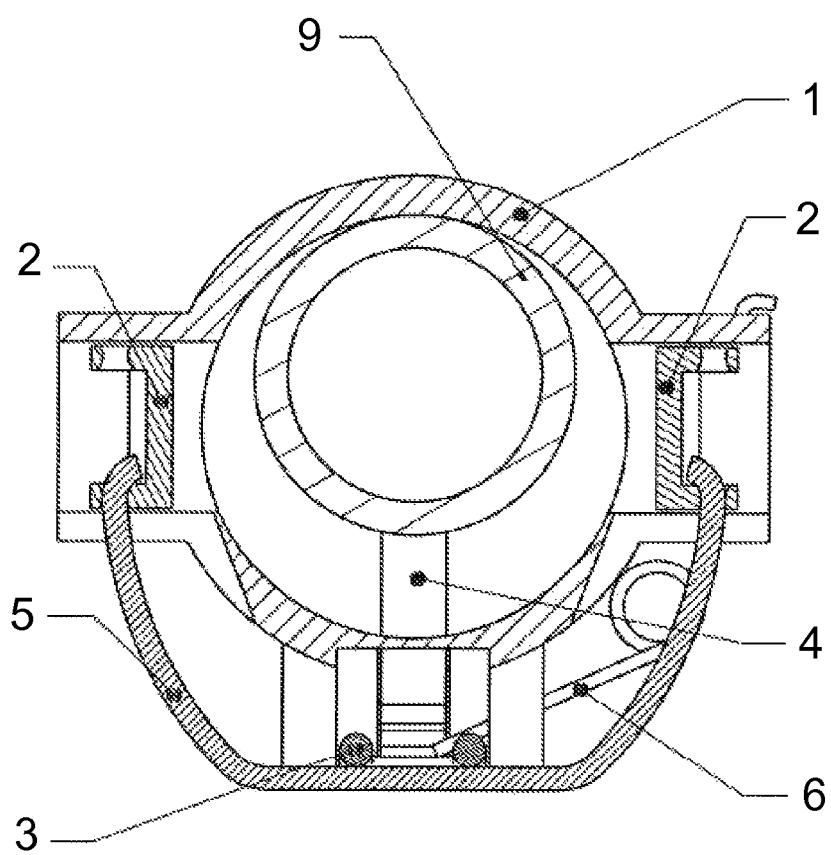
FIG. 3 illustrates a plan view of a filler neck with a petrol nozzle of minimum diameter in accordance with embodiments.
Figure 4:
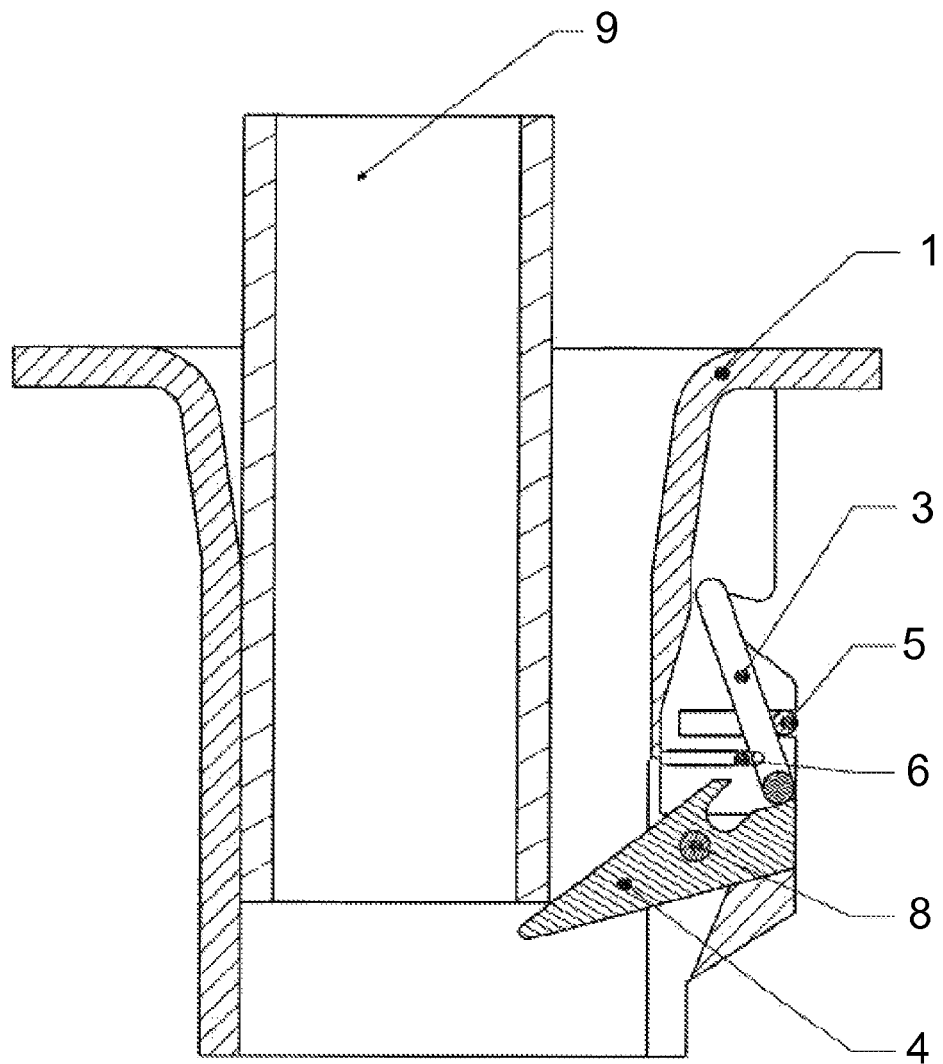
FIG. 4 illustrates a side view of a filler neck with a petrol nozzle of minimum diameter in accordance with embodiments.

As illustrated in FIGS. 2 to 4, insertion of a nozzle 9 of minimum petrol nozzle diameter is prevented by a filler neck in accordance with embodiments.

FIG. 2 illustrates the control levers 2 are pushed apart from each only slightly or not at all by the insertion of a nozzle 9 of minimum petrol nozzle diameter. In particular, the spacing distance of the control levers 2 corresponds to the diameter of the nozzle 9. In the idle state, the spacing distance of the control levers 2 corresponds roughly to the minimum diameter of a petrol nozzle 9.

FIG. 3 illustrates the same situation in plan view. The ends of the control spring 5 are pushed only minimally outwards or not at all by the insignificant outwardly pivoting of the control lever 2. The central, straight control portion of the control spring 5 is therefore also not pushed significantly inward, such that the blocker latch 3 is not driven inwards towards the notch in the blocker lever 4. The blocker latch spring 6 loads the blocker latch 3 outwardly.

As illustrated in FIG. 4, the control portion of the control spring 5 is guided in a slot in the housing 1, which extends radially from the outside inwards. Since, as described with reference to FIG. 3, the control spring 5 only undergoes an insignificant change in position, it remains in a position at the outside of this slot. The blocker latch 3, loaded outwards by the blocker latch spring 6, likewise remains in its position, in which it immobilizes the blocker lever 4 in the blocking position thereof. It is therefore impossible to introduce the nozzle 9 further into the filler neck.

Figure 5:
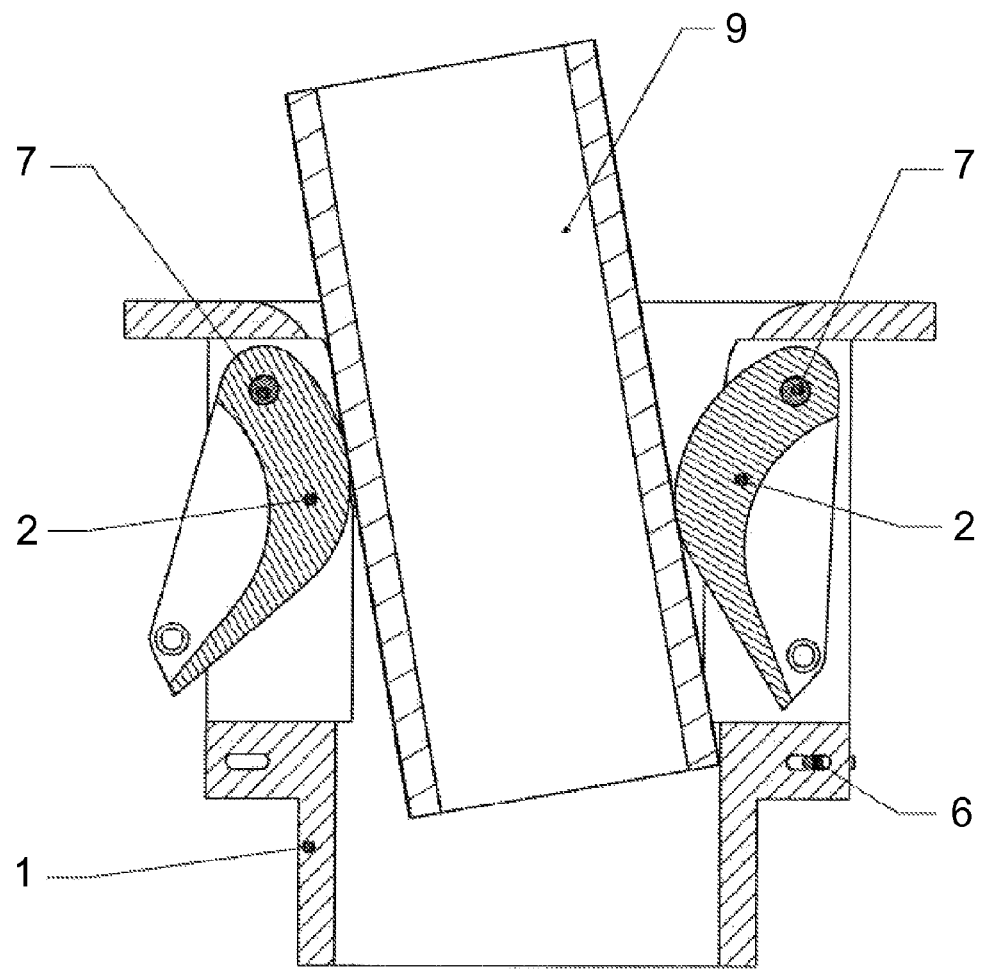
FIG. 5 illustrates a front view of a filler neck with a petrol nozzle of maximum diameter in accordance with embodiments.
Figure 6:
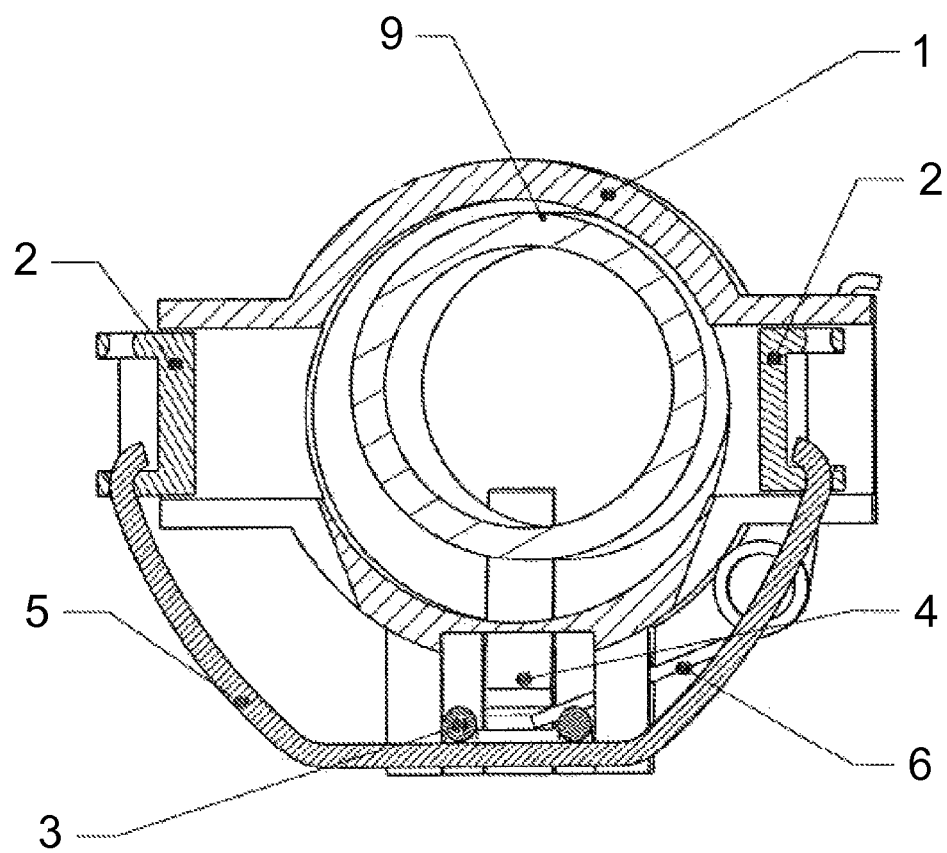
FIG. 6 illustrates a plan view of a filler neck with a petrol nozzle of maximum diameter in accordance with embodiments.
Figure 7:
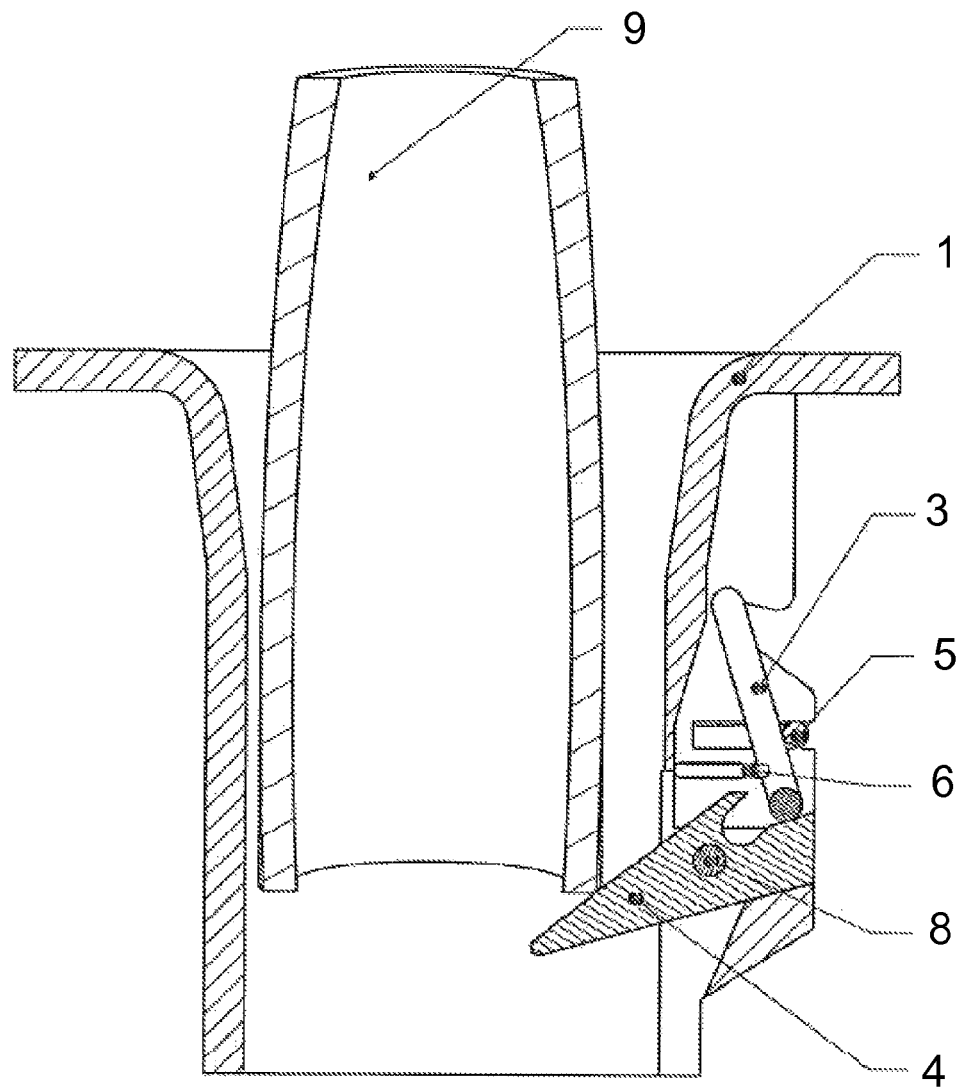
FIG. 7 illustrates a side view of a filler neck with a petrol nozzle of maximum diameter in accordance with embodiments.
Figure 8:
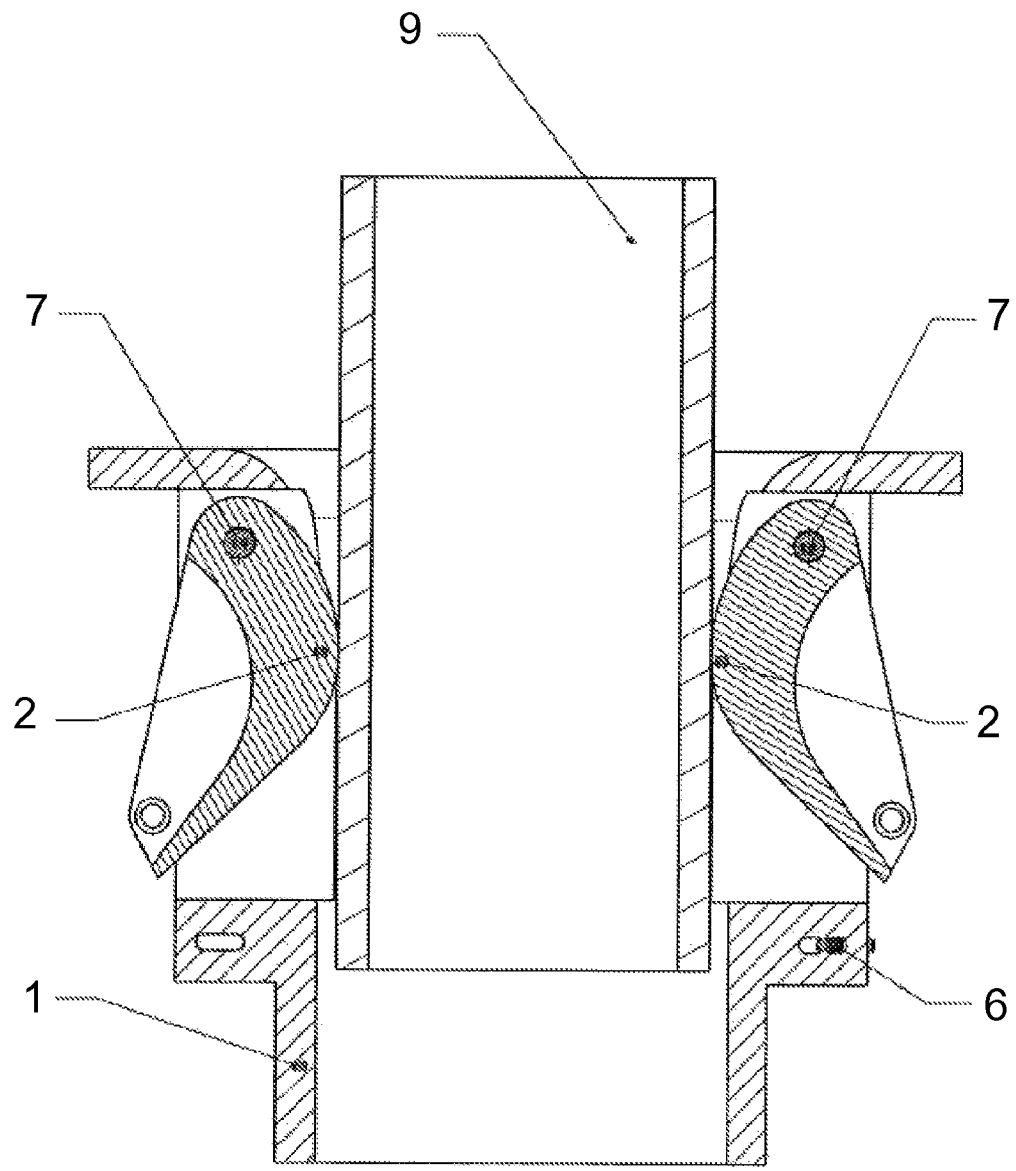
FIG. 8 illustrates a front view of a filler neck with a diesel nozzle of minimum diameter in accordance with embodiments.
Figure 9:
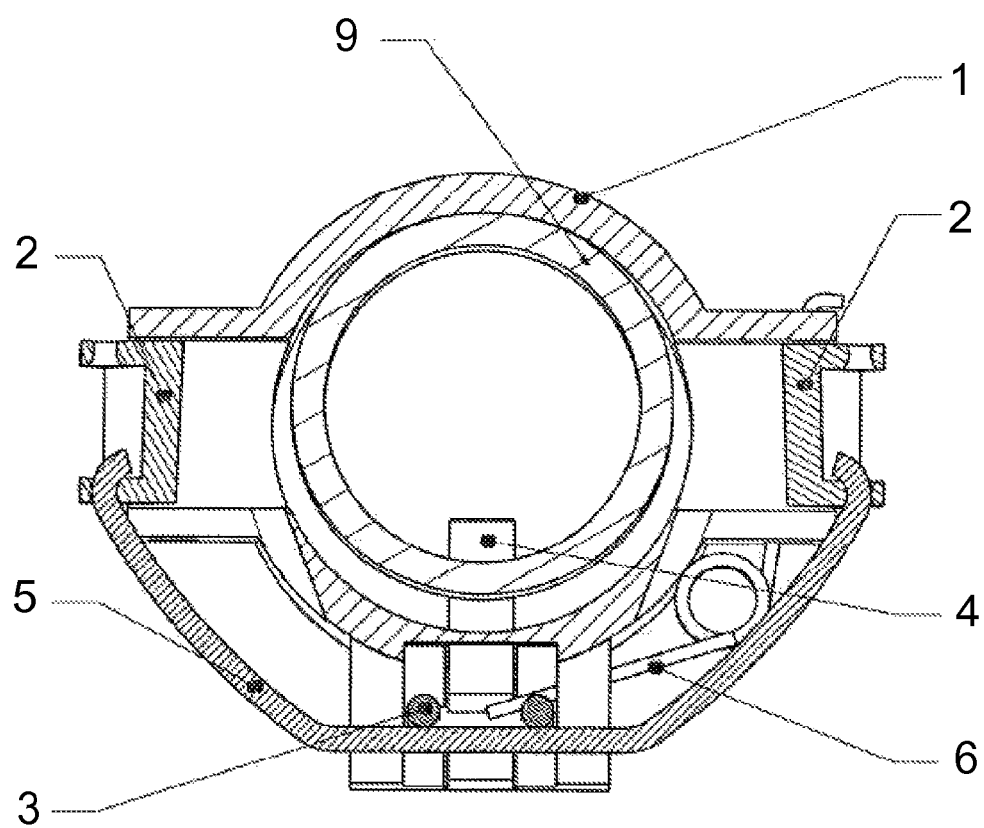
FIG. 9 illustrates a plan view of a filler neck with a diesel nozzle of minimum diameter in accordance with embodiments.
Figure 10:
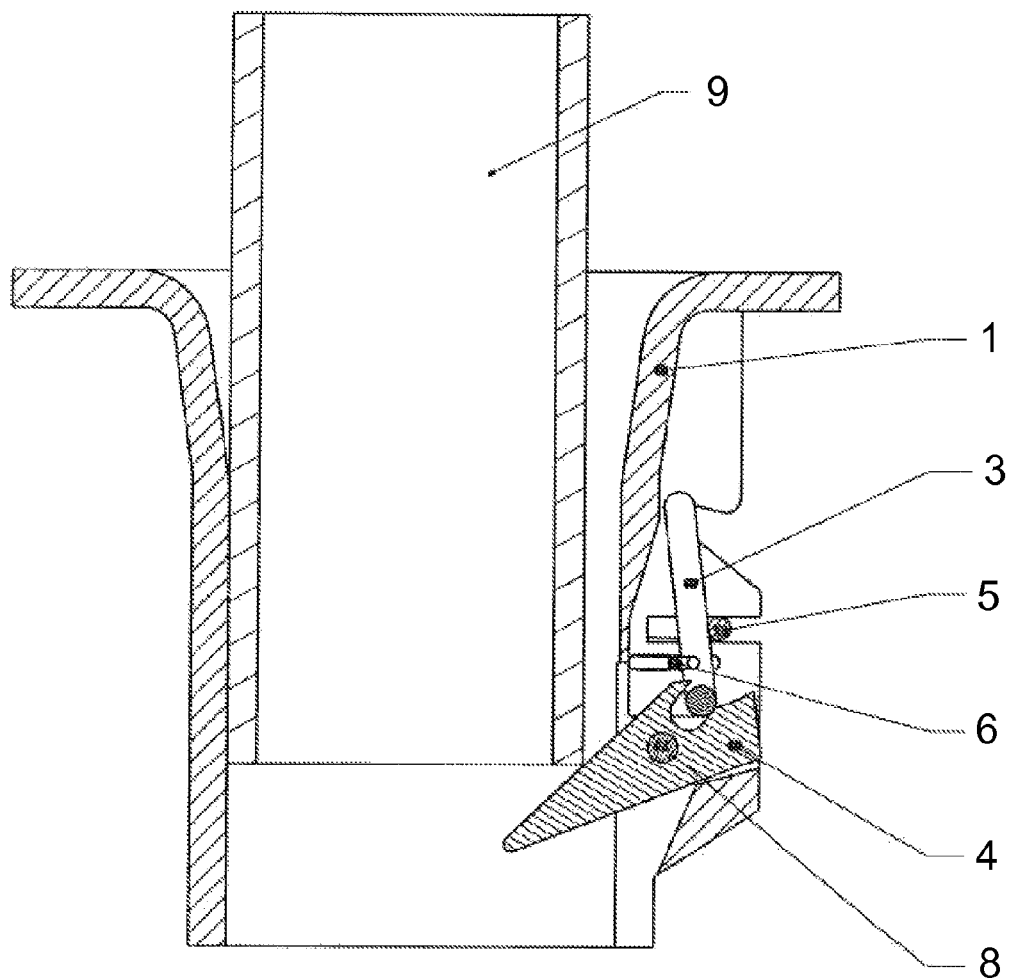
FIG. 10 illustrates a side view of a filler neck with a diesel nozzle of minimum diameter in accordance with embodiments.

As illustrated in FIGS. 5 to 7, a nozzle 9 of maximum petrol nozzle diameter is also hindered from passing through the blocker device in accordance with embodiments.

FIG. 5 illustrates a situation in which a nozzle 9 of maximum petrol nozzle diameter has approached the filler neck at an angle to the vertical axis. The curved shape of the control lever 2 ensures that even when a nozzle 9 is at an angle the control levers 2 do not pivot outwardly further than is desired. Although the control levers 2 therefore pivot somewhat further apart on insertion of a maximum petrol nozzle than of a minimum petrol nozzle, the change in position of the control portion of the control spring 5 and the blocker latch 3 remains so slight that the blocker lever 4 is still not released, as illustrated in FIGS. 5 to 7.

As illustrated in FIGS. 8 to 11 it is apparent how the blocker device of a filler neck in accordance with embodiments allows insertion beyond the blocker lever 4 of a nozzle 9 of minimum diesel nozzle diameter.

Through insertion of a nozzle 9 of minimum diesel nozzle diameter, the two control levers 2 are pushed apart to such an extent that the control spring 5 is pushed so far outwards at its ends and inwards in the middle that the blocker latch 3 slides inwards over the ramp of the blocker lever 4, such that the blocker lever 4 is no longer immobilized in its blocking position.

Figure 11:
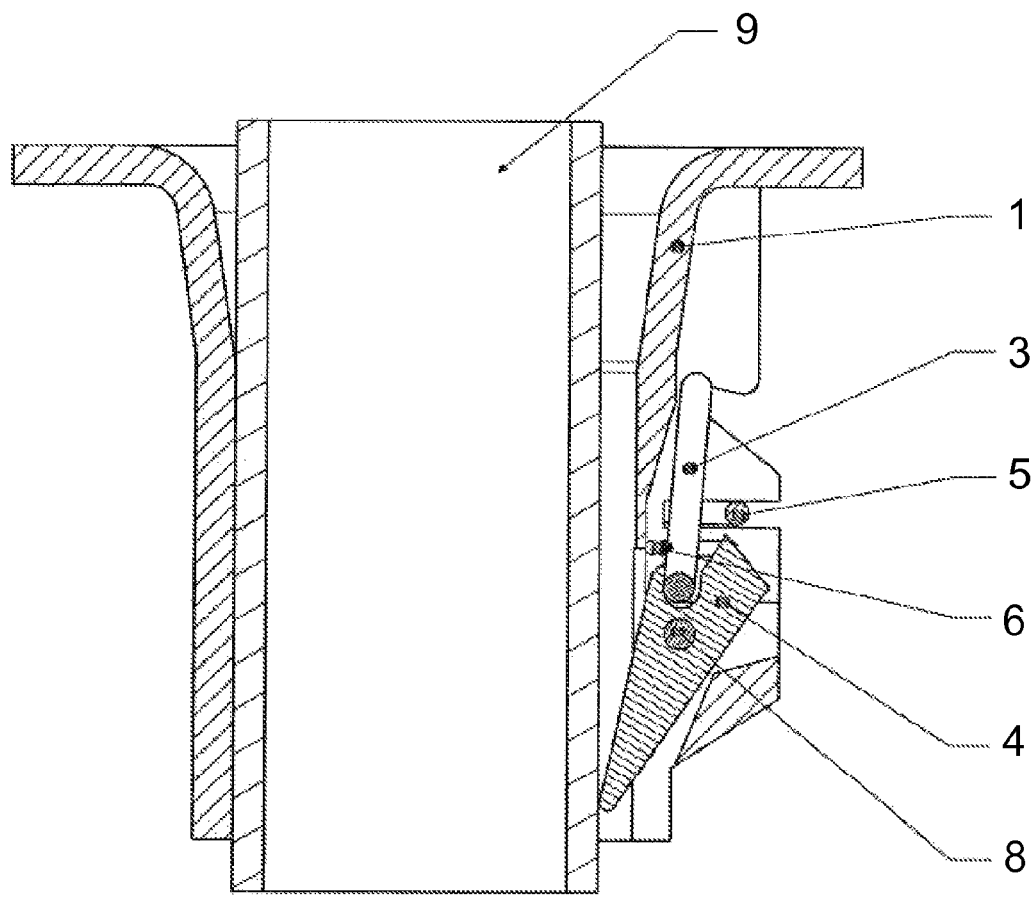
FIG. 11 illustrates a side view of a filler neck with a diesel nozzle of minimum diameter in accordance with embodiments.

As illustrated in FIG. 11, this makes possible further insertion of the nozzle 9 beyond the blocker lever 4. Through insertion of the nozzle 9, the blocker lever 4 is then pivoted further downwards, which can be done without the expenditure of greater force due to the notch in the blocker lever 4. The blocker latch 3 is then driven still further inwards, against the blocker latch spring 6.

Figure 12:
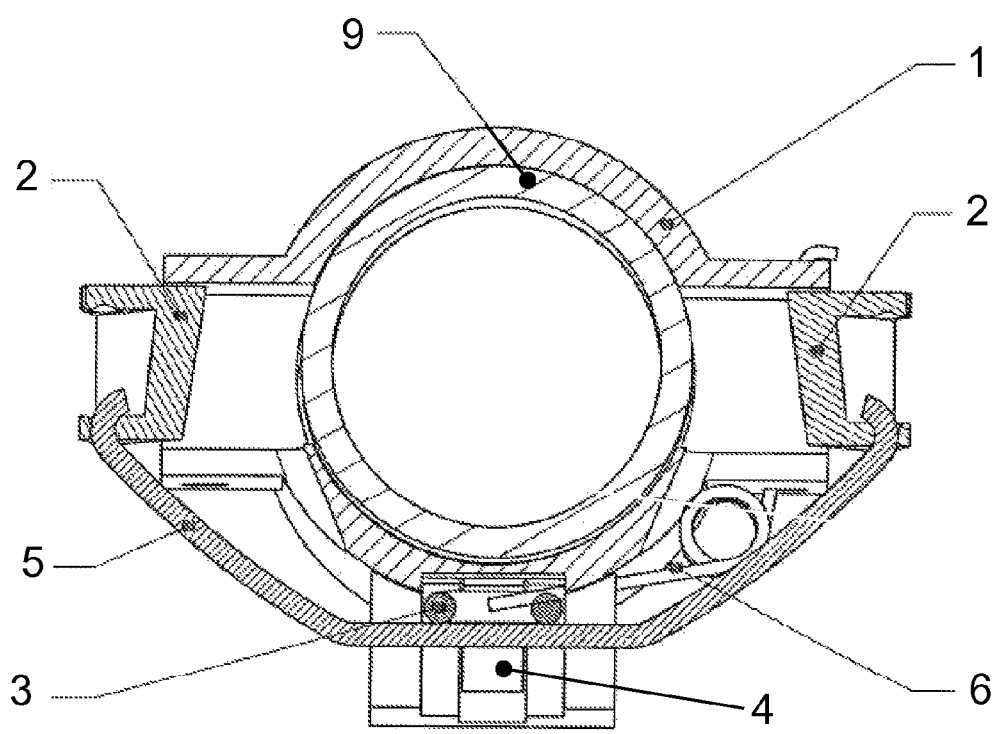
FIG. 12 illustrates a plan view of a filler neck with a diesel nozzle of maximum diameter in accordance with embodiments.
Figure 13:
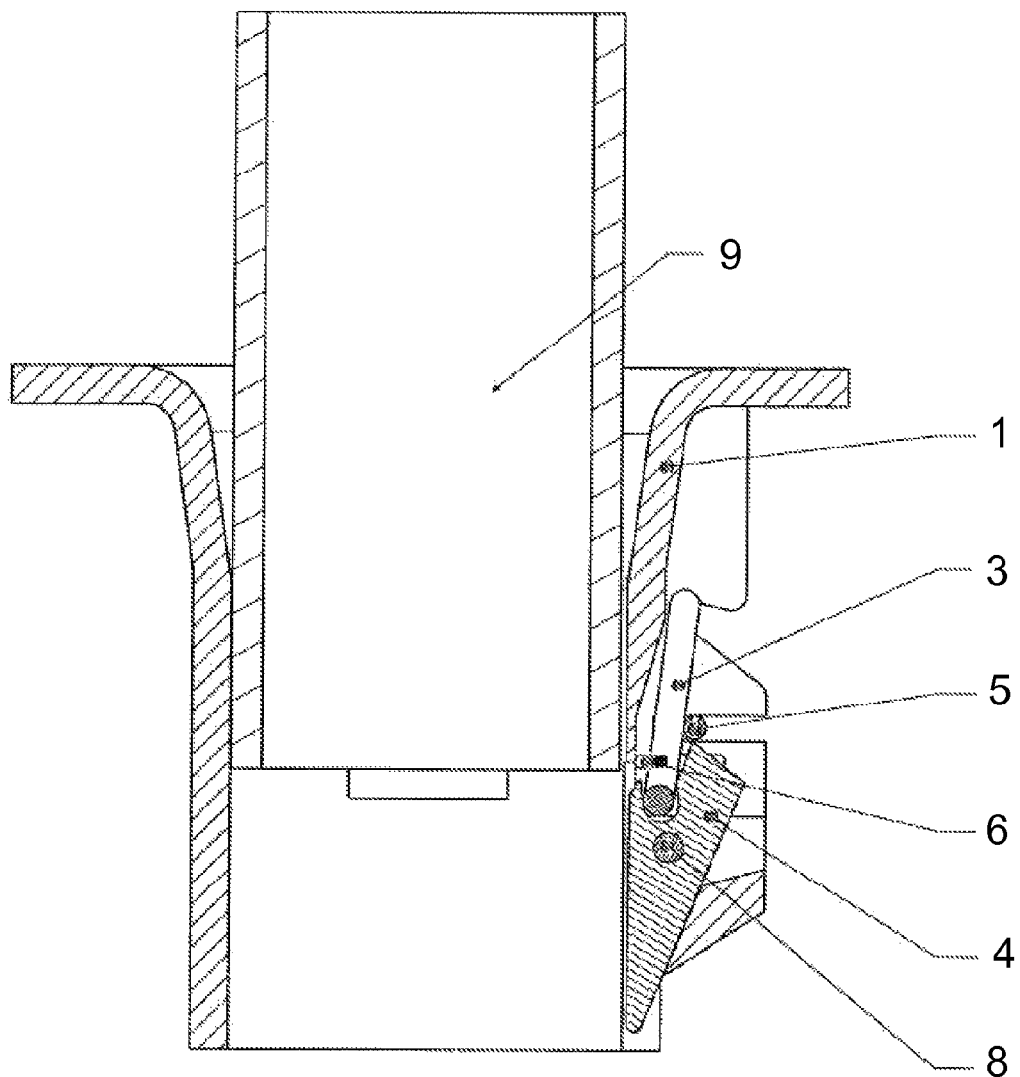
FIG. 13 illustrates a side view of a filler neck with a diesel nozzle of maximum diameter in accordance with embodiments.

As illustrated in FIGS. 12 and 13, a nozzle 9 of maximum diesel nozzle diameter may be inserted into the filler neck in accordance with embodiments. The control portion of the control spring 3 and thus also the blocker latch 3 are then pushed so far inwards that the control lever 4 adopts its open position, so allowing insertion of the nozzle 9 beyond the blocker lever 4.

Embodiments thus describes a reliable and inexpensive filler neck for a diesel fuel tank with a blocker device for preventing mis-fuelling with a nozzle of smaller diameter than the minimum diesel nozzle diameter.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A filler neck for a diesel fuel tank, the filler neck comprising:
    a filler neck housing;
    a pair of control levers mounted pivotably on control lever pivots in the filler neck housing and configured such that on insertion of a nozzle of a diameter greater than a minimum diesel nozzle diameter into the filler neck, the control levers pivot in an outward direction, and do not pivot in an outward direction on insertion of a nozzle of a diameter less than the minimum diesel nozzle diameter;
    a control spring attached respectively at both ends to the control levers and configured such that the pivoting in an outward direction by the control levers leads to a defined greater change in position for at least one control portion of the control spring;
    a blocker lever mounted on a blocker lever pivot in the filler neck housing and pivotable between a blocking position which prevents insertion of a nozzle beyond the blocking lever and an unblocking position in which insertion of a nozzle beyond the blocker lever is allowed;
    a blocker latch configured for movement between an immobilizing position and a non-immobilizing position, and which interacts with the blocker lever such that in the immobilizing position the blocker latch immobilizes the blocker lever in its blocking position, and in the non-immobilizing position does not immobilize the blocker lever in its blocking position whereby the blocker lever may pivot into the unblocking position;
    a blocker latch spring configured to load the blocker latch towards the immobilizing position,
    wherein the control spring is configured to permit movement of the blocker latch out of the immobilizing position into the non-immobilizing position by the defined greater change in position of at least the control portion of the control spring,
    wherein the blocker lever if not immobilized in the blocking position is configured to pivot into the unblocking position through the insertion of a nozzle.

2. The filler neck of claim 1, wherein inner sides of the control levers facing radially towards an inside of the filler neck, are curved inwardly.

3. The filler neck of claim 1, wherein the control levers are offset relative to one another by 180 degrees around the filler neck.

4. The filler neck of claim 1, wherein a minimum spacing of inner sides of the control levers facing radially towards an inside of the filler neck corresponds to the diameter of a petrol nozzle if no nozzle has been inserted into the filler neck.

5. The filler neck of claim 1, wherein the control portion of the control spring is formed by a central, straight part.

6. The filler neck of claim 1, wherein the control portion of the control spring is guided in a slot in the filler neck housing.

7. The filler neck of claim 6, wherein the slot in the filler neck housing extends radially from the outside to an inward direction.

8. The filler neck of claim 1, wherein the defined greater change in position of at least the control portion of the control spring is achieved by the ends of the control spring being pushed outwards by the control levers, and the control portion of the control spring being pushed inwards.

9. The filler neck of claim 1, wherein the blocker lever, in the blocking position prevents insertion of a nozzle beyond the blocker lever by occupying a sufficient part of the filler neck diameter, and in the unblocking position allows insertion of a nozzle beyond the blocker lever by opening up a sufficient part of the filler neck diameter.

10. The filler neck of claim 1, wherein the blocker lever comprises a contour with a notch and the blocker latch is located in its non-immobilizing position if a movable end of the blocker latch lies in the notch.

11. The filler neck of claim 10, wherein the control portion of the control spring is pushed inwards on the defined greater change in position at least of the control portion of the control spring and the movable end of the blocker latch is thereby pushed into the notch in the blocker lever.

12. The filler neck of claim 1, wherein the blocker lever comprises a contour with a notch and the blocker latch is located in its non-immobilizing position if a movable end of the blocker latch lies in the notch.

13. A filler neck for a diesel fuel tank, the filler neck comprising:
    control levers mounted pivotably for movement between a first position on insertion of a nozzle of a diameter less than the minimum diesel nozzle diameter, to a second position upon insertion of a nozzle of a diameter greater than the minimum diesel nozzle diameter into the filler neck;
    a blocker lever mounted pivotably between a blocking position which prevents insertion of a nozzle beyond the blocking lever and an unblocking position in which insertion of a nozzle beyond the blocker lever is allowed;
    a blocker latch mounted for movement between an immobilizing position which immobilizes the blocker lever in its blocking position, and a non-immobilizing position which permits the blocker lever to move to the unblocking position; and
    a control spring operatively attached respectively at both ends to the control levers and configured such that the second position of the control levers results in a defined greater change in position for a control portion of the control spring, and also configured to permit movement of the blocker latch out of the immobilizing position into the non-immobilizing position by the defined greater change in position of the control portion of the control spring,
    wherein the blocker lever, if not immobilized in the blocking position, is configured to pivot into the unblocking position through the insertion of a nozzle.

14. The filler neck of claim 13, further comprising a blocker latch spring configured to load the blocker latch towards the immobilizing position.

15. The filler neck of claim 13, wherein a minimum spacing of inner sides of the control levers facing radially towards an inside of the filler neck corresponds to the diameter of a petrol nozzle if no nozzle has been inserted into the filler neck.

16. The filler neck of claim 13, wherein the blocker lever, in the blocking position prevents insertion of a nozzle beyond the blocker lever by occupying a sufficient part of the filler neck diameter, and in the unblocking position allows insertion of a nozzle beyond the blocker lever by opening up a sufficient part of the filler neck diameter.

17. The filler neck of claim 13, wherein the control levers are offset relative to one another by 180 degrees around the filler neck.

* * * * *